United States Patent
Pinarbasi

(10) Patent No.: US 6,856,493 B2
(45) Date of Patent: Feb. 15, 2005

(54) SPIN VALVE SENSOR WITH IN-STACK BIASED FREE LAYER AND ANTIPARALLEL (AP) PINNED LAYER PINNED WITHOUT A PINNING LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 10/104,124

(22) Filed: Mar. 21, 2002

(65) Prior Publication Data

US 2003/0179513 A1 Sep. 25, 2003

(51) Int. Cl.[7] .................................................. G11B 5/39
(52) U.S. Cl. .................................................. 360/324.11
(58) Field of Search ........................ 360/324.11, 324.12, 360/324, 324.1, 324.2, 126

(56) References Cited

U.S. PATENT DOCUMENTS

| | | | |
|---|---|---|---|
| 5,465,185 A | 11/1995 | Heim et al. | 360/113 |
| 5,583,725 A | 12/1996 | Coffey et al. | 360/113 |
| 5,668,688 A | * 9/1997 | Dykes et al. | 360/324.1 |
| 5,701,223 A | 12/1997 | Fontana, Jr. et al. | 360/113 |
| 5,768,069 A | 6/1998 | Mauri | 360/113 |
| 5,920,446 A | 7/1999 | Gill | 360/113 |
| 6,023,395 A | 2/2000 | Dill et al. | 360/113 |
| 6,040,961 A | 3/2000 | Gill | 360/113 |
| 6,114,719 A | 9/2000 | Dill et al. | 257/295 |
| 6,117,569 A | 9/2000 | Lin et al. | 428/692 |
| 6,127,053 A | 10/2000 | Lin et al. | 428/692 |
| 6,219,211 B1 | 4/2001 | Gill | 360/324.11 |
| 6,222,707 B1 | 4/2001 | Huai et al. | 360/324.1 |
| 6,313,973 B1 | * 11/2001 | Fuke et al. | 360/324.1 |
| 6,438,026 B2 | * 8/2002 | Gillies et al. | 365/158 |
| 6,473,279 B2 | * 10/2002 | Smith et al. | 360/324.12 |
| 6,512,660 B1 | * 1/2003 | Li et al. | 360/324 |
| 6,538,856 B1 | * 3/2003 | Gill | 360/319 |
| 6,548,114 B2 | * 4/2003 | Everitt et al. | 427/255.7 |
| 6,556,392 B1 | * 4/2003 | Mao et al. | 360/324.12 |

OTHER PUBLICATIONS

*IEEE Transactions on Magnetics*, vol. 35, No. 2, Mar. 1999, "Spin Valve and Dual Spin Valve Heads with Synthetic Antiferromagnets".
*Journal of Applied Physics*, vol. 87, No. 9, May 1, 2000, "Enhanced robustness and tunnel magnetoresistance in artifical ferrimagnet based tunnel junctions".
*Applied Physics Letters*, vol. 77, No. 22, Nov. 27, 2000, "Enhance–ment of thermal stability of magnetic tunnel junctions employing artificial ferromagnets".

* cited by examiner

Primary Examiner—Angel Castro
(74) Attorney, Agent, or Firm—Ervin F. Johnston

(57) ABSTRACT

A spin valve sensor has an antiparallel (AP) pinned layer structure which has ferromagnetic first and second AP pinned layers that are separated by an antiparallel coupling layer. The first and second AP pinned layers are self-pinned antiparallel with respect to one another without the assistance of an antiferromagnetic (AFM) pinning layer. The spin valve sensor further includes an in-stack longitudinal biasing layer structure which is magnetostatically coupled to the free layer for longitudinally biasing a magnetic moment of the free layer parallel to an air bearing surface and parallel to major planes of the layers of the sensor. The only AFM pinning layer employed is in the biasing layer structure so that when the magnetic spins of the AFM pinning layer are set the orientations of the magnetic moments of the AP pinned layer structure are not disturbed.

33 Claims, 6 Drawing Sheets

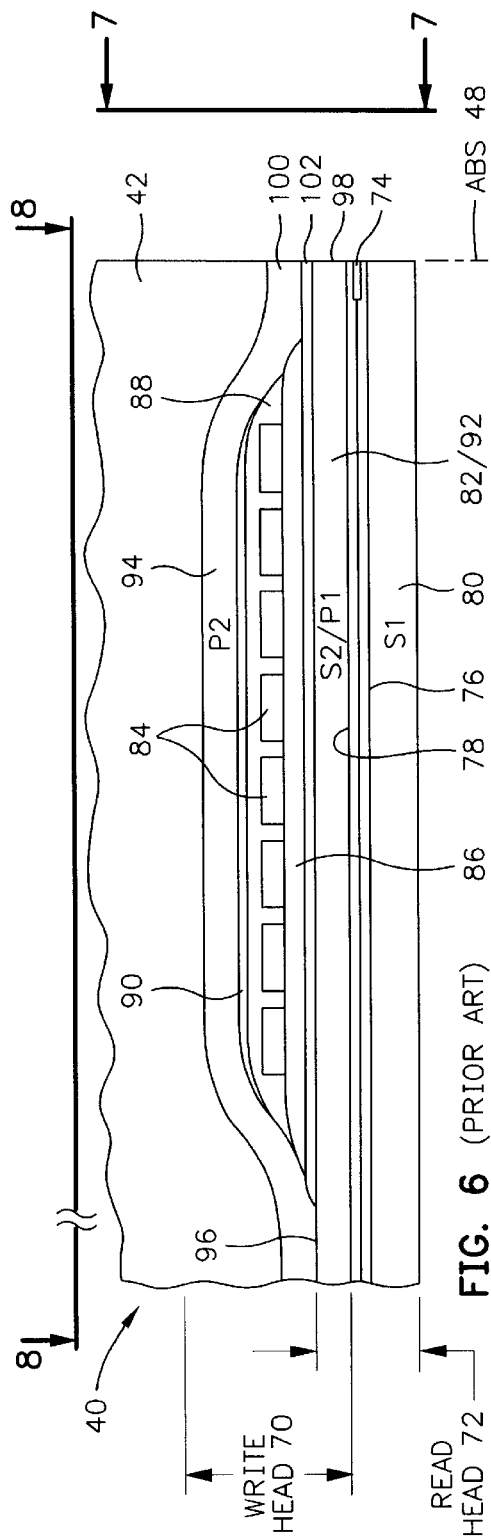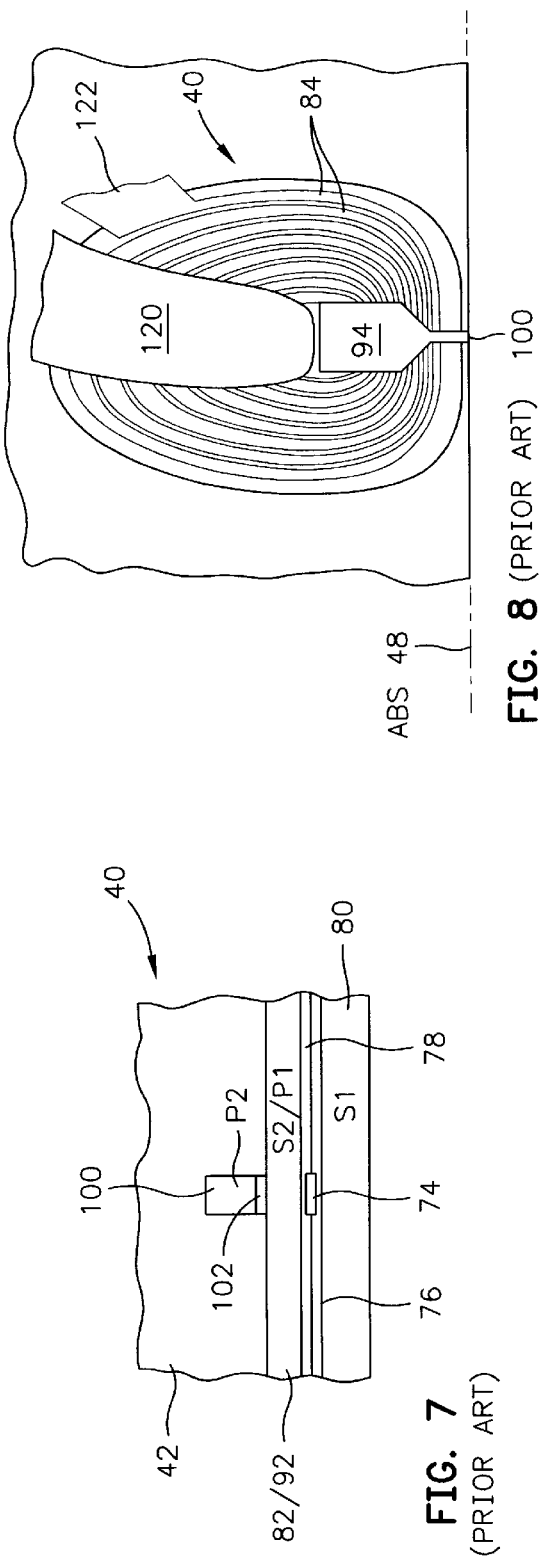
FIG. 6 (PRIOR ART)
FIG. 7 (PRIOR ART)
FIG. 8 (PRIOR ART)

(ABS)

SPIN VALVE SENSOR WITH IN-STACK BIASED FREE LAYER AND ANTIPARALLEL (AP) PINNED LAYER PINNED WITHOUT A PINNING LAYER

CROSS REFERENCE TO RELATED APPLICATION

The present application is related to commonly assigned co-pending U.S. patent application Ser. No. 10/104,712 by Freitag et al filed on Mar. 21, 2002 and entitled "HIGH MAGNETORESISTANCE SPIN VALVE SENSOR WITH SELF-PINNED ANTIPARALLEL (AP) PINNED LAYER STRUCTURE" which is incorporated in its entirety by reference herein.

BACKGROUND OF THE INVENTION

1. Field of the Invention

The present invention relates to a spin valve sensor with an in-stack biased free layer and an antiparallel (AP) pinned layer pinned without a pinning layer and, more particularly, to such a sensor with a biasing structure located in the sensor stack and within the track width of the sensor for longitudinally biasing the free layer.

2. Description of the Related Art

The heart of a computer is a magnetic disk drive which includes a rotating magnetic disk, a slider that has write and read heads, a suspension arm above the rotating disk and an actuator arm. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer typically interfaces the pinned layer structure for pinning a magnetic moment of the pinned layer structure 90° to the air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from the rotating magnetic disk. The quiescent position, which is preferably parallel to the ABS, is the position of the magnetic moment of the free layer structure with the sense current conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a bottom spin valve sensor or a top spin valve sensor depending upon whether the pinning layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel to one another. Spin valve sensors are still further classified as single or dual wherein a single spin valve sensor employs only one pinned layer and a dual spin valve sensor employs two pinned layers with the free layer structure located therebetween.

As stated hereinabove, a magnetic moment of the aforementioned pinned layer structure is pinned 90° to the ABS by the aforementioned antiferromagnetic (AFM) pinning layer. After deposition of the sensor, the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to room temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields do not disturb the setting of the pinning layer.

It is also desirable that any pinning layer be as thin as possible since it is located within the track width of the sensor and its thickness adds to an overall gap length between the first and second shield layers. The read gap is the length between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

A scheme for minimizing the aforementioned gap length between the first and second shield layers is to provide a self-pinned AP pinned layer structure. The self-pinned AP pinned layer structure eliminates the need for the aforementioned pinning layer which permits the read gap to be reduced by 150 Å when the pinning layer is platinum manganese (PtMn). In the self-pinned AP pinned layer structure each AP pinned layer has an intrinsic uniaxial anisotropy field and a magnetostriction uniaxial anisotropy field. The intrinisic uniaxial anisotropy field is due to the intrinsic magnetization of the layer and the magnetostriction uniaxial anisotropy field is a product of the magnetostriction of the layer and stress within the layer. A positive magnetostriction of the layer and compressive stress therein results in a magnetostriction uniaxial anisotropy field that can support an intrinsic uniaxial anisotropy field. The orientations of the magnetic moments of the AP pinned layers are set by an external field. This is accomplished without the aforementioned elevated temperature which is required to free the magnetic spins of the pinning layer. If the self-pinning of the AP pinned layer structure is not sufficient, unwanted extraneous fields can disturb the orientations of the magnetic moments of the AP pinned layers or, in a worst situation, could reverse their directions. Accordingly, there is a strong-felt need to maximize the uniaxial magnetostriction anisotropy field while maintaining a high magnetoresistive coefficient dr/R of the spin valve sensor.

Further, it is important that the material of the pinning layer be non-corrosive since it is typically exposed at the ABS. A material of choice for any pinning layer is platinum manganese (PtMn). It has a blocking temperature of about 350° C. and its thickness can be on the order of 150 Å for pinning the pinned layer. While the blocking temperatures of other AFM materials, such as iron manganese (FeMn) and iridium manganese (IrMn), are lower, each of these materials is corrosive. Nickel oxide (NiO), which is electrically non-conductive and has a lower blocking temperature than platinum manganese, is not desirable because its thickness must be on the order of 400 Å in order to pin the pinned layer.

It is also important that the free layer be longitudinally biased (biased parallel to the ABS and parallel to the major planes of the thin film layers of the sensor) in order to magnetically stabilize the free layer. This is typically accomplished by first and second hard bias magnetic layers which abut first and second side surfaces of the spin valve sensor. Unfortunately, the magnetic field through the free layer between the first and second side surfaces is not uniform since a portion of the magnetization is lost in a central region of the free layer to the shield layers. This is especially troublesome when the track width of the sensor is submicron. End portions of the free layer abutting the hard bias layers are over-biased and become very stiff in their response to field signals from the rotating magnetic disk. The stiffened end portions can take up a large portion of the total length of a sub-micron sensor. It should be understood that a narrow track width is important for promoting the track width density of the read head. The more narrow the track width the greater the number of tracks that can be read per linear inch along a radius of the rotating magnetic disk. This further enables an increase in the magnetic storage capacity of the disk drive.

There is a need in the art for reducing the gap length without sacrificing dr/R, reducing the stiffening of the magnetic moment of the free layer when longitudinally biased and minimizing any disturbance of the resetting of the pinning layer.

SUMMARY OF THE INVENTION

An aspect of the invention is to provide an in-stack biasing structure, which is located within the track width of the sensor, for longitudinally biasing the free layer of the sensor in a direction parallel to the ABS and parallel to the major planes of the layers of the sensor with a significantly reduced sensor stack thickness. In a preferred embodiment the biasing structure includes a ferromagnetic pinned layer and a nonmagnetic electrically conductive coupling layer which is located between and interfaces the pinned layer and the free layer so that the pinned and free layers are magnetically coupled. The biasing layer structure further includes an antiferromagnetic (AFM) pinning layer which is exchange coupled to the pinned layer for pinning a magnetic moment of the pinned layer parallel to the ABS and parallel to the major planes of the layers of the sensor. Because of the magnetic coupling between the pinned and free layers the free layer is uniformly biased from a first side surface to a second side surface. This biasing is more uniform than the aforementioned first and second hard bias layers adjacent the side surfaces of the free layer which results in overbiasing end regions of the free layer and restricting the employment of narrow track width sensors. However, prior art in-stack biasing schemes have not been usable for narrow read gap read heads.

Another aspect of the invention is to provide a self-pinning antiparallel (AP) pinned layer structure without an AFM pinning layer pinning the AP pinned layer structure. The self-pinning is accomplished by uniaxial anisotropies of the AP pinned layers which are oriented perpendicular to the ABS and, in combination, self-pin the magnetic moments of the first and second AP pinned layers perpendicular to the ABS and antiparallel with respect to each other.

The use of the self-pinning scheme permits the employment of a single antiferromagnetic material, which material is used for the AFM pinning layer in the biasing structure. This is made possible by the fact that the AP pinned layer structure is self-biasing and does not require the AFM pinning layer. Accordingly, after fabricating the read head the magnetic spins of the AFM pinning layer in the biasing structure can be set by elevating the temperature at or near the blocking temperature of the AFM material in the presence of a field that is oriented parallel to the ABS and parallel to the major planes of the layers of the sensor. Upon removing the elevated temperature, the magnetic spins of the AFM pinning layer are set to pin the magnetic moment of the pinned layer parallel to the ABS and parallel to the planes of the layers of the sensor. This does not affect the perpendicular orientation of the AP pinned layers of the AP pinned layer structure since these layers are not pinned by an AFM pinning layer. The preferred AFM material for the pinning layer of the biasing structure is platinum manganese. Since there is no other AFM material that has the features of platinum manganese the fact that only one AFM pinning layer is required by the present invention is significant.

It should be noted that if the AP pinned layer structure was pinned by an AFM pinning layer that a selection would have to be made of the material for the pinning layer. If platinum manganese (PtMn), which is the material of choice, is employed for the pinning layer, platinum manganese would then be used for not only pinning the pinned layer but also for longitudinally biasing the free layer. If the pinning layer is reset, as described hereinabove, a subsequent reset of the biasing layer would disturb the resetting of the pinning layer. Assuming that both the AFM pinning layer and the biasing layers are platinum manganese, elevating the blocking temperature of platinum manganese in the presence of a field oriented parallel to the ABS and parallel to the major thin film planes of the layers in order to reset the biasing layers will reset the pinning layer also parallel to the ABS which is 90° from the required pinning direction. Alternatively, if platinum manganese is employed for the pinning layer and another AFM material is employed for the biasing layers with a lower blocking temperature, two problems accrue. The first problem is that there is no other suitable AFM material, other than platinum manganese, for pinning or biasing layers and secondly, even though the setting of the biasing layers is at a temperature lower than the blocking temperature of platinum manganese, the magnetic spins of the platinum manganese pinning layer are still disturbed to some extent which lowers the exchange coupling between the pinning layer in the AP pinned layer structure. This means that the AP pinned layer structure is not strongly pinned and the magnetic moment of the AP pinned layer structure may not return to its original pinned direction when the read head is subjected to thermal spikes in the presence of extraneous magnetic fields.

The present invention employs cobalt iron (CoFe) for each of the first and second AP pinned layers in a self-pinned AP pinned layer structure, however, the iron (Fe) content in the cobalt iron (CoFe) in the first and second AP pinned layers is different for improving the magnetostriction uniaxial anisotropy field while maintaining a high magnetoresistive coefficient dr/R. More specifically, the iron (Fe) content in the cobalt iron (CoFe) of one of the first and second AP pinned layers is greater than the iron (Fe) content in the cobalt iron (CoFe) in the other of the first and second AP pinned layers. In one embodiment of the invention the iron (Fe) content in the cobalt iron (CoFe) in the first AP pinned layer, which does not interface the spacer layer, is greater than the iron (Fe) content in the cobalt iron (CoFe) in the second AP pinned layer which interfaces the spacer layer. Experiments, which are explained in the aforementioned co-pending application, show that when the content of the first AP pinned layer comprises $Co_{60}Fe_{40}$ and the content of the second AP pinned layer comprises $Co_{90}Fe_{10}$ the amplitude output and the magnetostriction uniaxial anisotropy field are improved while maintaining a high magnetoresistive coefficient dr/R.

In another embodiment of the invention the iron (Fe) content in the cobalt iron (CoFe) in the second AP pinned layer is greater than the iron (Fe) content in the cobalt iron (CoFe) in the first AP pinned layer. One of the experiments showed that when the second AP pinned layer included a second film located between first and third films wherein the iron (Fe) content in the cobalt iron (CoFe) in the second film was greater than the iron (Fe) content in the cobalt iron (CoFe) in each of the first and third films that the magnetoresistive coefficient dr/R was not seriously degraded. In this experiment the content of the second film comprised $Co_{60}Fe_{40}$ and the content of each of the first and third films comprised $Co_{90}Fe_{10}$. From these experiments a still further embodiment is derived wherein the first AP pinned layer comprises $Co_{60}Fe_{40}$ and the second AP pinned layer comprises the aforementioned first, second and third films.

An object is to provide a spin valve sensor with an AFM biased free layer and a self-biased AP pinned layer structure wherein amplitude output of the sensor is improved.

Another object is to improve the linear bit density of an in-stack biasing sensor by reducing the stack height of the sensor.

A further object is to provide a method for making the aforementioned spin valve sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
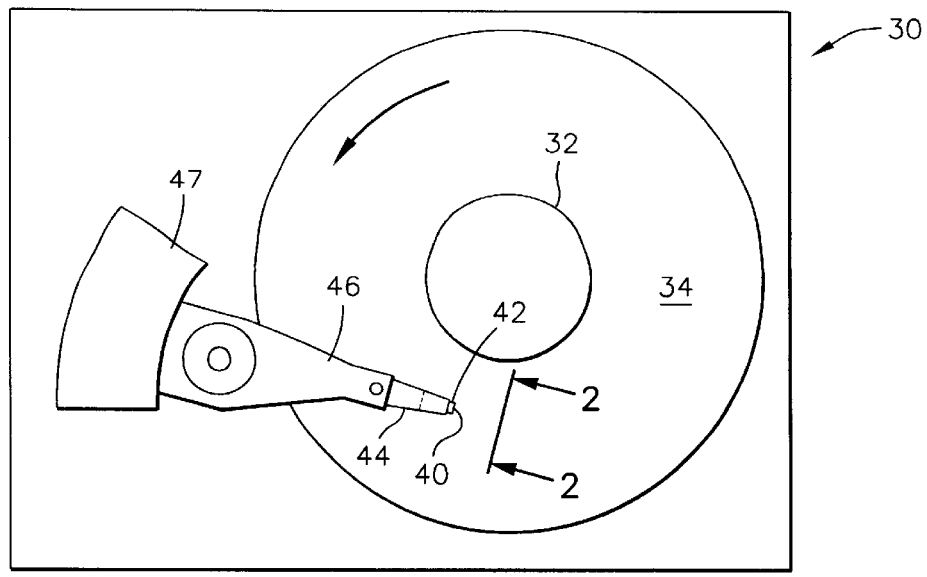
FIG. 1 is a plan view of an exemplary magnetic disk drive.
Figure 2:
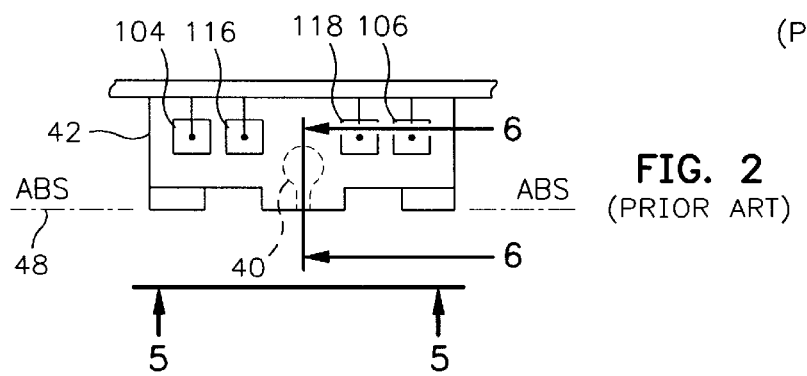
FIG. 2 is an end view of a slider with a magnetic head of the disk drive as seen in plane 2—2 of FIG. 1.
Figure 3:
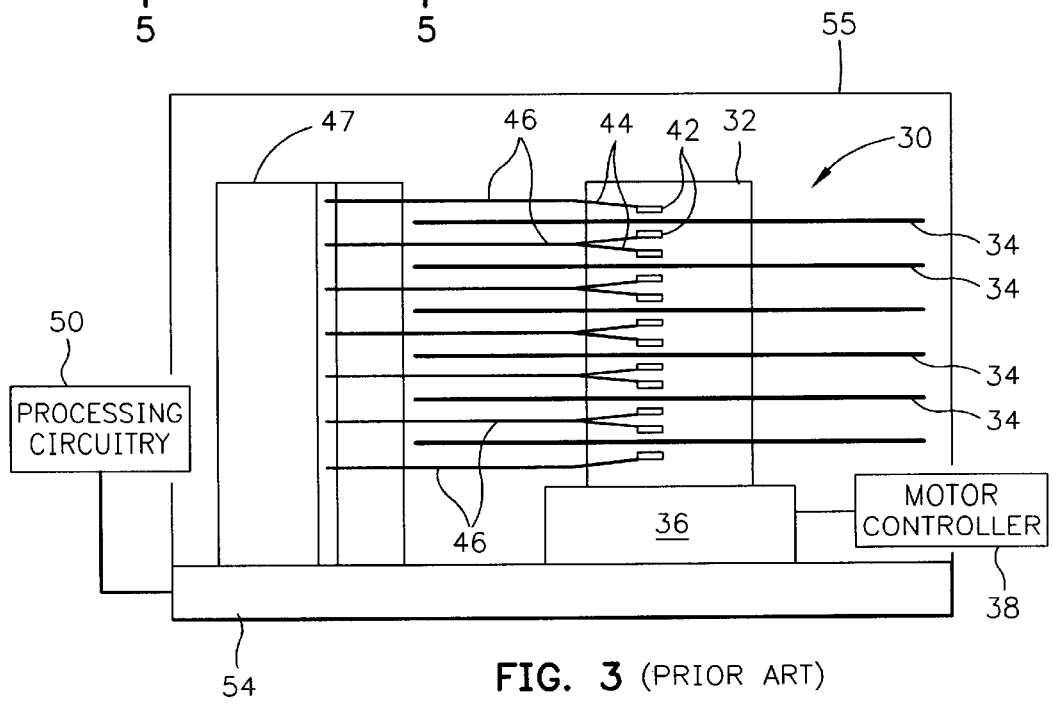
FIG. 3 is an elevation view of the magnetic disk drive wherein multiple disks and magnetic heads are employed.
Figure 4:
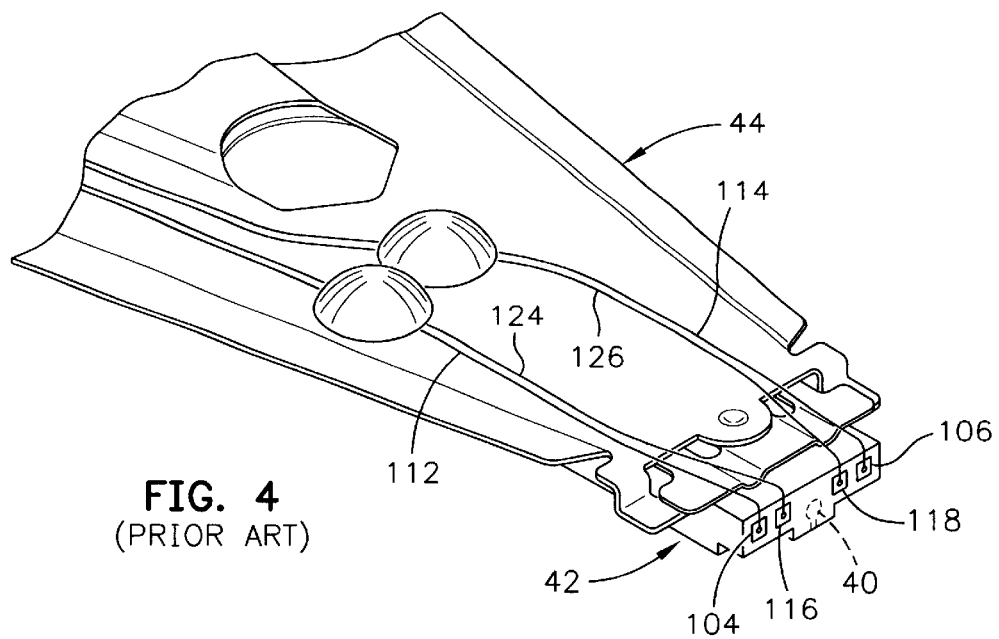
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
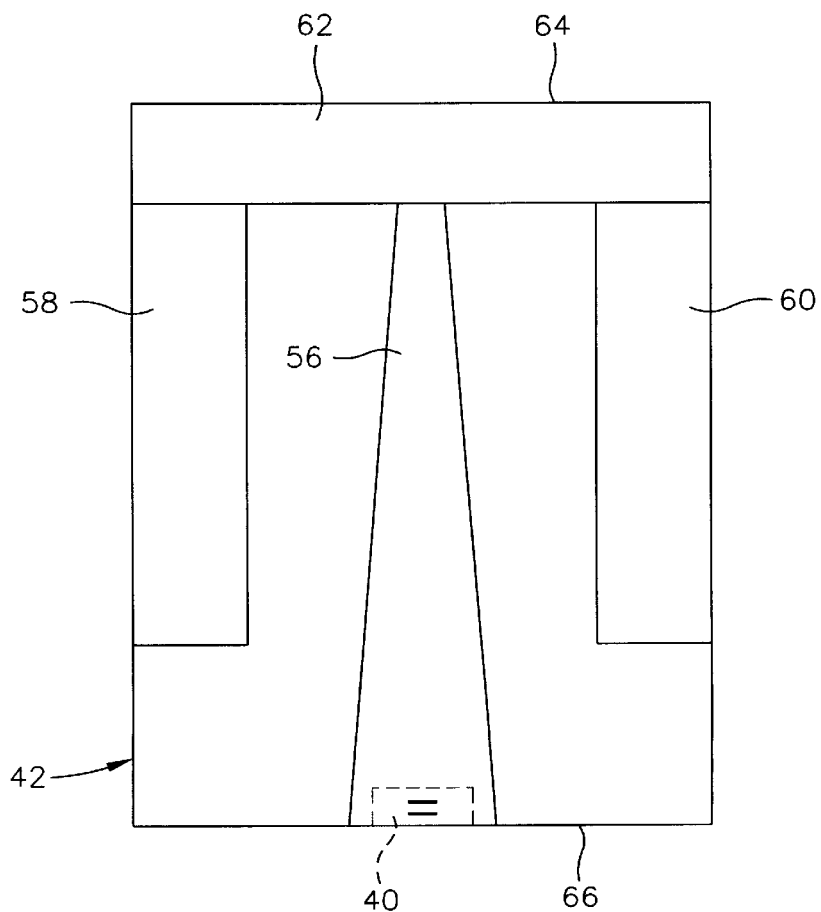
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
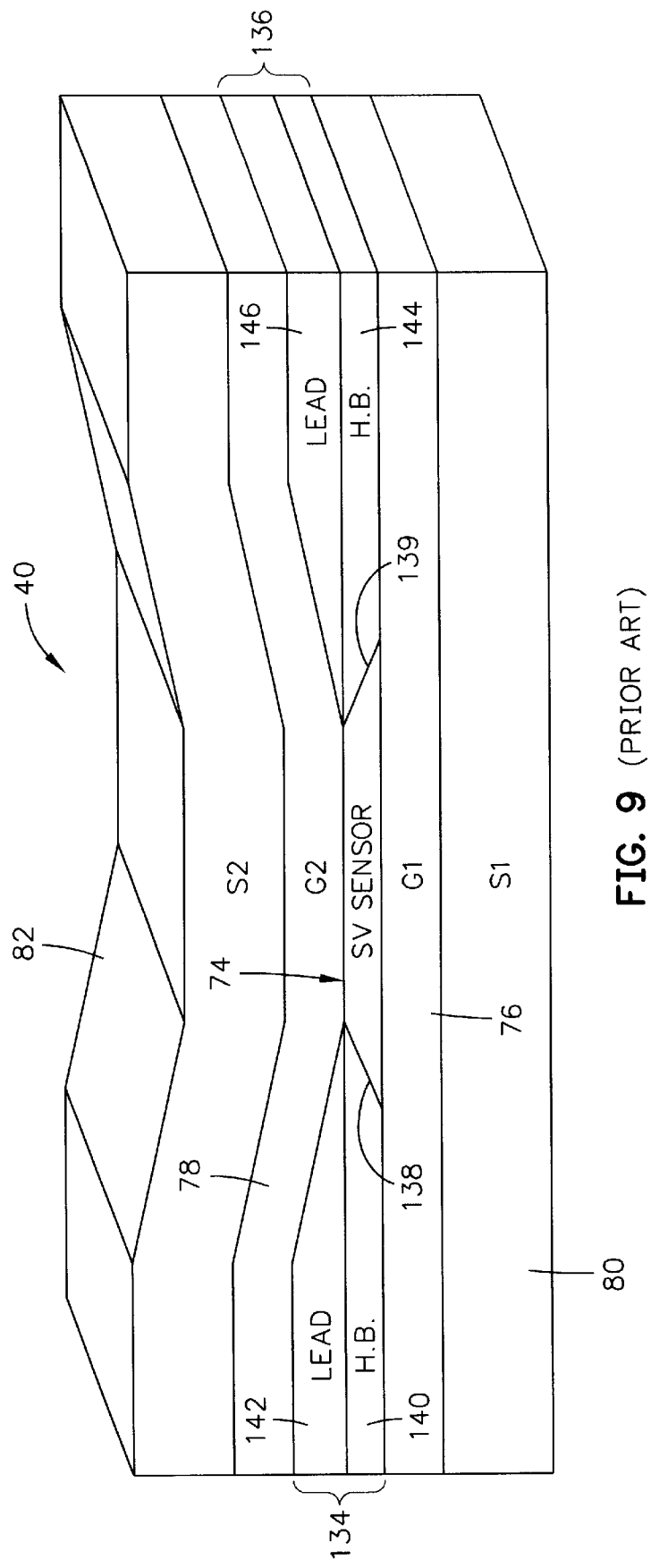
FIG. 9 is an enlarged isometric ABS illustration of the read head with a prior art spin valve sensor.

FIG. 9 is an isometric ABS illustration of the read head 40 shown in FIG. 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78 and the first and second read gap layers 76 and 78 are, in turn, located between the ferromagnetic first and second shield layers 80 and 82.

Unfortunately, the first and second hard bias layers 140 and 144 in FIG. 9 do not uniformly stabilize a free layer within the sensor 74. Hard bias layers typically stiffen the magnetic moment of the free layer at end portions of the sensor abutting the hard bias layers so that these portions are stiff in their response to field signals from the rotating magnetic disk. With submicron track widths, this loss, which can be 0.1 µm in width at each end of the sensor, is unacceptable. Further, a central portion of the free layer may not be properly stabilized since magnetic flux is progressively drawn in by the first and second shield layers 80 and 82 as the flux lines from the hard bias layers extend inwardly from the side edges 138 and 139.

The Invention

Figure 10:
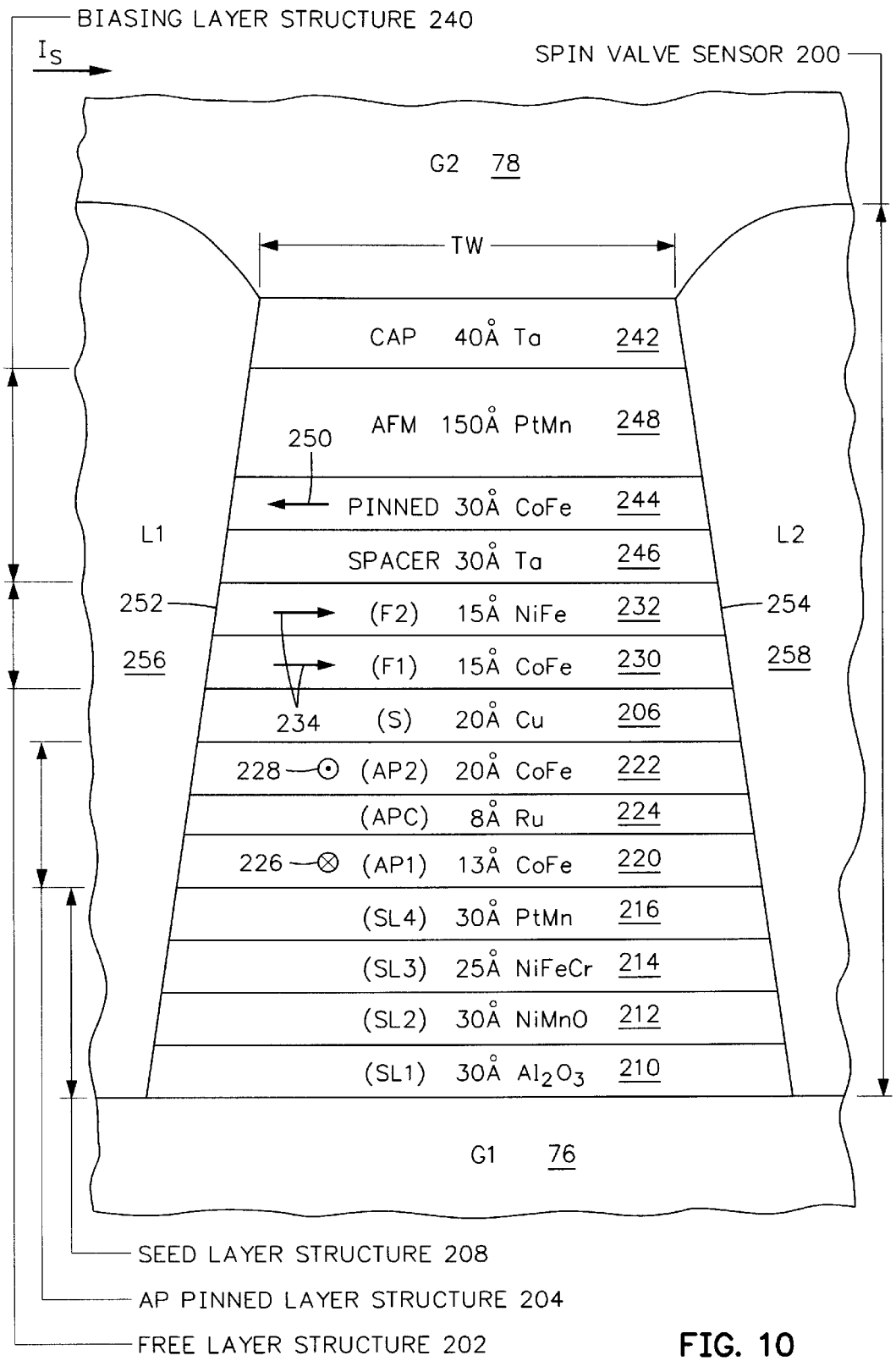
FIG. 10 is an ABS view of one embodiment of the present spin valve sensor.

One embodiment of the present spin valve sensor 200 is illustrated in FIG. 10 wherein the spin valve sensor is located between the first and second read gap layers 76 and 78. The spin valve sensor 200 includes a free layer structure 202 and an antiparallel (AP) pinned layer structure 204. A nonmagnetic electrically nonconductive spacer layer (S) 206 is located between the free layer structure 202 and the AP pinned layer structure 204. Because the free layer structure 202 is located between the AP pinned layer structure 204 and the second read gap layer 78 or the first pole piece layer 92 the spin valve sensor 200 is a bottom spin valve sensor. A seed layer structure 208 may be located between the first read gap layer 76 and the AP pinned layer structure 204. The seed layer structure 208 may include first, second, third and fourth seed layers (SL1), (SL2), (SL3) and (SL4) 210, 212, 214 and 216. The seed layers, with the thicknesses and materials shown, have been found to promote a desirable texture of the layers deposited thereon.

It should be noted that the spin valve sensor 200 does not include the typical antiferromagnetic (AFM) pinning layer for pinning magnetic moments of the AP pinned layer structure 204. An aspect of the invention is to provide an AP pinned layer structure 204 which is self-pinning. The AP pinned layer structure 204 includes ferromagnetic first and second AP pinned layers (AP1) and (AP2) 220 and 222. A nonmagnetic electrically conductive antiparallel coupling (APC) layer 224 is located between and interfaces the first and second AP pinned layers 220 and 222. The first AP pinned layer 220 has a magnetic moment 226 which is oriented perpendicular to the ABS in a direction, either toward the ABS or away from the ABS, as shown in FIG. 10, and the second AP pinned layer has a magnetic moment 228 which is oriented antiparallel to the magnetic moment 226 by a strong antiparallel coupling between the first and second AP pinned layers 220 and 222. The preferred material for the first and second AP pinned layers 220 and 222 is cobalt iron (CoFe).

In a preferred embodiment, one of the AP pinned layers is thicker than the other, such as the first AP pinned layer 220 may be 13 Å and the second AP pinned layer 222 may be 20 Å. The direction of the magnetic moment 228, either into or out of the sensor, is determined by the direction in which the magnetic moment 228 is set by an external magnetic field. With the arrangement shown in FIG. 10, the magnetic field has been applied out of the sensor which causes the magnetic moment 228 to be directed out of the sensor. If the external field is reversed in its direction, the magnetic moment 228 would be directed into the sensor. In another embodiment the first AP pinned layer 220 may be thicker than the second AP pinned layer 222. In still another embodiment the thicknesses of the first and second AP pinned layers 220 and 222 may be equal. In this instance, the application of an external magnetic field to one or the other of the AP pinned layers 220 and 222 will set the direction of the one AP pinned layer which will, in turn, set the direction of the magnetic moment of the other AP pinned layer antiparallel thereto. When the AP pinned layers 220 and 222 are formed by sputter deposition they are deposited in the presence of a field which is oriented perpendicular to the ABS. In this manner, the easy axes of the first and second AP pinned layers will be likewise oriented perpendicular to the ABS.

The free layer structure 202 may include first and second free layers (F1) and (F2) 230 and 232. It has been found that when the free layer structure 202 has a cobalt iron first free layer 230 between the spacer layer 206 and a nickel iron second free layer 232 that the magnetoresistive coefficient dR/R of the spin valve sensor is increased. The free layer structure has a magnetic moment 234 which is oriented parallel to the ABS and parallel to the major thin film planes of the layers. A sense current $I_S$ is conducted through the spin valve sensor from right to left or from left to right, as shown in FIG. 10. When a field signal from the rotating magnetic disk rotates the magnetic moment 234 into the sensor the magnetic moments 234 and 228 become more antiparallel which increases the resistance of the sensor to the sense current $I_S$ and when a field signal rotates the magnetic moment 234 out of the sensor the magnetic moments 234 and 228 become more parallel which decreases the resistance of the sensor to the sense current $I_S$. These resistance changes change potentials within the processing circuitry 50 in FIG. 3 which are processed as playback signals.

An in-stack biasing layer structure 240 is located within the stack of the spin valve sensor and within the track width of the sensor for longitudinally biasing the magnetic moment 234 of the free layer structure parallel to the ABS and parallel to the major planes of the layers of the sensor, which planes define the thicknesses of the layers. A cap layer 242 is located on the biasing layer structure for protecting it from subsequent processing steps. The biasing layer structure 240 may include a ferromagnetic pinned layer 244 and a nonmagnetic electrically nonconductive spacer layer 246 which is located between and interfaces the free layer structure 202 and the pinned layer 244. The biasing layer structure 244 may further include an antiferromagnetic (AFM) pinning layer 248 which interfaces and is exchange coupled to the pinned layer 244 for pinning a magnetic moment 250 of the pinned layer parallel to the ABS and parallel to the major thin film planes of the layers of the sensor. Because of the spacer layer 246 the pinned layer 244 is magnetostatically coupled to the free layer structure 202 so there is flux closure between the biasing and free layer structures 240 and 202. This causes a longitudinal biasing of the free layer structure 202 for stabilizing its magnetism, which stabilization is uniform between the side surfaces 252 and 254 of the free layer structure. This overcomes the problem of the aforementioned stiffening of the end regions of the free layer structure which limits narrow track width sensors. Insulation layers 256 and 258 contact the side surfaces 252 and 254 for preventing shunting of the sense current $I_S$.

It should be noted that without an AFM pinning layer for the AP pinned layer structure that the setting of the magnetic spins of the AFM layer 248 will not cause a disturbance of the operation of the AP pinned layer structure. This then enables the use of a single AFM material for the sensor. Since platinum manganese (PtMn) is a material of choice and since there are no other satisfactory AFM materials, the present invention enables the use of platinum manganese (PtMn) as the single AFM material employed in the read head.

Exemplary thicknesses of the layers are 30 Å of $Al_2O_3$ for the layer 210, 30 Å of NiMnO for the layer 212, 25 Å of NiFeCr for the layer 214, 30 Å of PtMn for the layer 216, 13 Å of CoFe for the layer 220, 8 Å of Ru for the layer 224, 20 Å of CoFe for the layer 222, 20 Å of Cu for the layer 206, 15 Å of CoFe for the layer 230, 15 Å of NiFe for the layer 232, 30 Å of Ta for the layer 246, 30 Å of CoFe for the layer 244, 150 Å of PtMn for the layer 248 and 40 Å of Ta for the layer 242. The spin valve sensor in FIG. 10 is known in the art as a bottom spin valve sensor since the free layer structure 202 is located between the AP pinned layer structure 204 and the first pole piece layer 98 in FIGS. 6 and 7.

An aspect of the invention is the employment of materials for the first and second AP pinned layers AP1 and AP2 that result in a strongly self-pinned AP pinned layer structure wherein the sensor has an improved amplitude output and an acceptable magnetoresistive coefficient dr/R. Test results wherein $Co_{60}Fe_{40}$ is employed in various AP pinned layers are shown in Examples 1–5 in the following chart from the aforementioned co-pending application.

$Co_{60}Fe_{40}$ Experiments

| Example | Position Inserted | dR/R (%) | $H_{Ki}$ | λ(AP) | $H_{K\lambda}$ | $R_{s(\Omega/sq)}$ | λ(FL) |
|---|---|---|---|---|---|---|---|
| 1 | Prior Art | 9.16 | 30 Oe | +1.5E−05 | 300 Oe | 23.0 | −7.64E−07 |
| 2 | AP1 | 9.11 | 30 Oe | +3.0E−5 | 500 Oe | 23.3 | −4.00E−7 |
| 3 | AP2 | 8.07 | 30 Oe | +3.0E−5 | 500 Oe | 21.6 | −7.29E−07 |
| 4 | AP1/ AP2 | 8.01 | 30 Oe 30 Oe | +3.0E−5 +3.0E−5 | 500 Oe 500 Oe | 21.5 | −2.58E−07 |
| 5 | AP2 * | 8.91 | 30 Oe | +1.9E−5 | 400 Oe | 23.4 | −4.07E−07 |
| 6 | AP1/ AP2 * | | | | | | |

* lamination

Examples 1–5 were tested at the coupon level and Examples 1 and 2 were further tested at the row level. At the coupon level a single sensor is fabricated on a glass substrate and is not lapped to the ABS. Since lapping causes the aforementioned ABS compressive stress the ABS compressive stress due to lapping is not present at the coupon level. The row level is a row of read heads including their read sensors and is taken from a slider substrate where rows and columns of such read heads have been fabricated. After dicing the row of read heads from the slider substrate, the row is lapped to the ABS which causes the aforementioned compressive stress.

At the coupon level the magnetoresistive coefficient dr/R, the intrinsic uniaxial anisotropy field $H_{Ki}$, the magnetostriction λ (AP) of the AP pinned layers, the magnetostriction uniaxial anisotropy field $H_{K\lambda}$, the resistance of the sensor $R_S$ and the magnetostriction of the free layer λ (FL) were determined and/or calculated. At the row level Examples 1 and 2 were tested for amplitude output.

In the prior art Example 1 AP1 was 13 Å of $Co_{90}Fe_{10}$ and AP2 was 20 Å of $Co_{90}Fe_{10}$. The dr/R was 9.16% and the $H_{K\lambda}$ of each AP pinned layer was 300 Oe. The amplitude output tested at the row level was 875 microvolts.

Two examples, which are embodiments of the present invention, are Examples 2 and 5. In Example 2 AP1 was 13 Å of $Co_{60}Fe_{40}$ and AP2 was 20 Å of $Co_{90}Fe_{10}$. The dr/R was satisfactory and the output tested at the row level was 1225 microvolts which is 40% greater than the output in Example 1. In Example 5 AP1 was 13 Å of $Co_{90}Fe_{10}$ and AP2 was a lamination of a second film of 5 Å $Co_{60}Fe_{40}$ between a first film of 5 Å $Co_{90}Fe_{10}$ and a third film of 10 Å $Co_{90}Fe_{10}$. The dr/R was satisfactory at 8.91%. Example 5, which was not tested, is a combination of Examples 2 and 5.

In Example 3 AP1 was 13 Å $Co_{90}Fe_{10}$ and AP2 was 20 Å $Co_{60}Fe_{40}$. It can be seen that the dr/R of 8.07% was a significant drop from the dr/R in Example 1. In Example 4 AP1 was 13 Å $Co_{60}Fe_{40}$ and AP2 was 20 Å $Co_{60}Fe_{40}$. Again, it can be seen that the dr/R of 8.01% is a significant drop from the dr/R in Example 1.

Accordingly, an aspect of the invention is that one of the AP pinned layers has a higher iron (Fe) content than the other of the AP pinned layers. The preferred embodiments are shown in Examples 2, 5 and 6.

Figure 11:
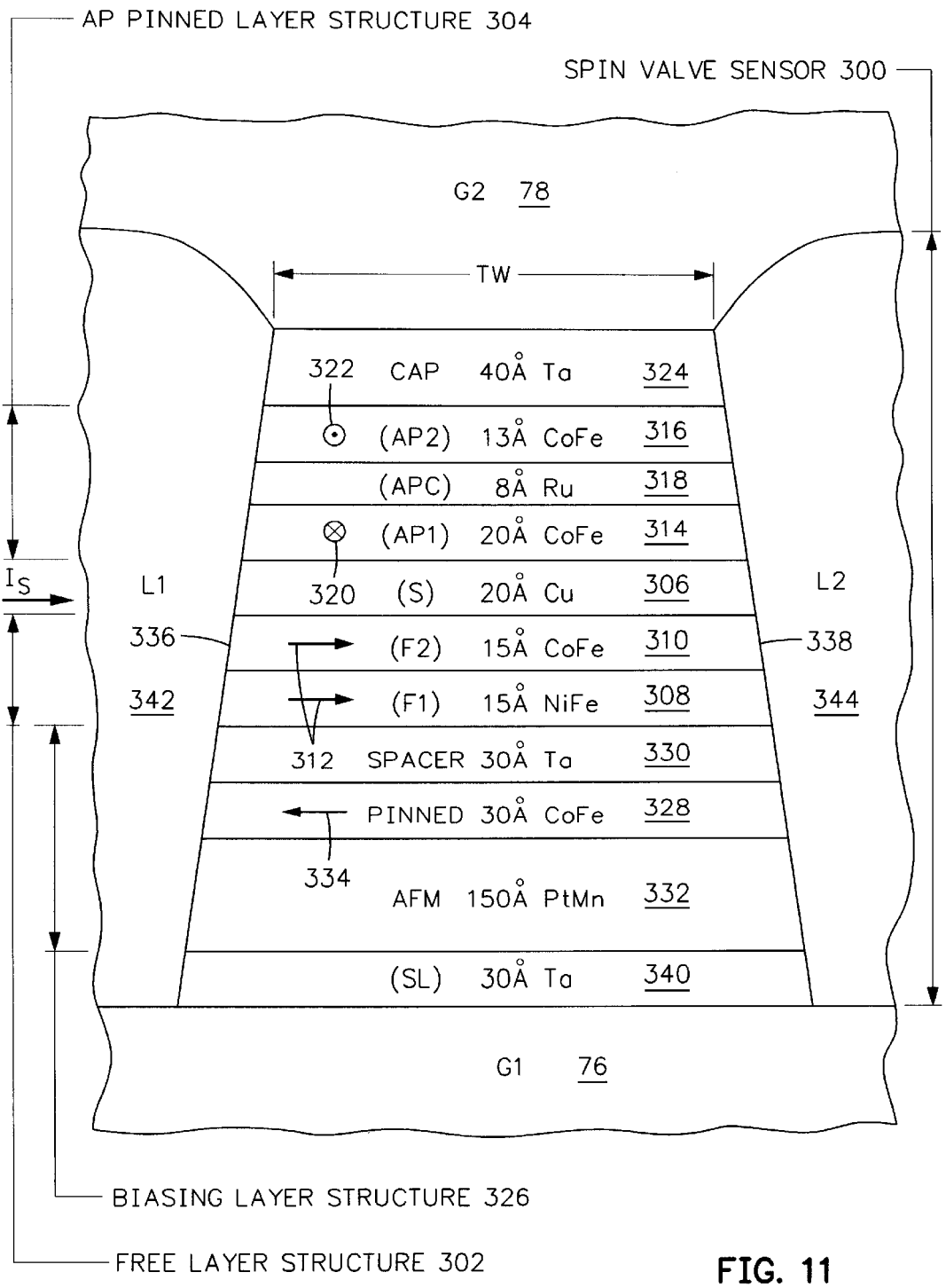
FIG. 11 is an ABS view of another embodiment of the present spin valve sensor.

Another embodiment of the present spin valve sensor 300 is illustrated in FIG. 11. The spin valve sensor 300 includes a free layer structure 302, an antiparallel (AP) pinned layer structure 304 and a nonmagnetic electrically conductive spacer layer (S) 306 which is located between and interfaces the free layer structure 302 and the AP pinned layer structure 304. The free layer structure 302 may have first and second free layers (F1) and (F2) 308 and 310 with the free layer 308 being nickel iron and the free layer 310 being cobalt iron with the cobalt iron being located between a copper spacer layer 306 and the nickel iron free layer 308 for improving the magnetoresistive coefficient dR/R of the sensor. The free layer structure 302 has a magnetic moment 312 which is parallel to the ABS and parallel to the major planes of the sensor in a direction from right to left or from left to right, as shown in FIG. 11.

The AP pinned layer structure 304 includes ferromagnetic first and second AP pinned layers (AP1) and (AP2) 314 and 316 and an antiparallel coupling (APC) layer 318 which is located between and interfaces the first and second AP pinned layers 314 and 316. The AP pinned layers 314 and 316 have magnetic moments 320 and 322 which are oriented perpendicular to the ABS and antiparallel with respect to one another. The first and second AP pinned layers 314 and 316 have uniaxial anisotropies that cause a self-pinning between the first and second AP pinned layers. Since the first AP pinned layer 314 is thicker than the second AP pinned layer 316 it has a greater magnetic moment and will dominate the directions of the magnetic moments 320 and 322. While it is preferred that one of the AP pinned layers be thicker than the other the invention will still operate with first and second AP pinned layers 320 and 322 of equal thickness. The direction of the magnetic moments can be established by applying an outside field to one of the AP pinned layers in a first direction which causes the magnetic moment of the other AP pinned layer to have a second direction which is antiparallel to the first direction. The operation of the spin valve sensor 300 in response to field signals from the rotating magnetic disk is the same as that described hereinabove for the spin valve sensor 200 in FIG. 10. A cap layer 324 may be located on the AP pinned layer structure 304 for protecting it from subsequent processing steps.

An in-stack biasing layer structure 326 is located in the stack of the sensor and within the track width for longitudinally biasing the magnetic moment 312 of the free layer structure 302. The biasing layer structure 326 may include a ferromagnetic pinned layer 328 and a nonmagnetic electrically conductive spacer layer 330 which is located between and interfaces the pinned layer 328 and the free layer structure 302. An antiferromagnetic (AFM) pinning layer 332 interfaces and is exchange coupled to the pinned layer 328 for pinning a magnetic moment 334 of the pinned layer parallel to the ABS and parallel to the planes of the layers of the sensor. The spacer 330 causes the pinned layer 328 and the free layer structure 302 to be magnetostatically coupled so that there is flux closure between the biasing layer structure 326 and the free layer structure 302. Accordingly, the magnetic moment 334 aligns the magnetic moment 312 of the free layer structure parallel to the ABS and parallel to the major planes of the sensor shown in FIG. 11. This biasing is uniform from a first side surface 336 to a second side surface 338 of the free layer structure so that the biasing does not cause a limitation on narrow track width sensors. A seed layer (SL) 340 may be located between the first read gap layer 76 and the pinning layer 332 for promoting improved texture of the layers deposited thereon. Leads (L1) and (L2) 342 and 344 contact the side surfaces 336 and 338 for conducting the sense current $I_S$ through the sensor 300.

Exemplary thicknesses and materials of the layers are 30 Å of Ta for the layer 340, 150 Å of PtMn for the layer 332, 30 Å of CoFe for the layer 328, 30 Å of Ta for the layer 330, 15 Å of NiFe for the layer 308, 15 Å of CoFe for the layer 310, 20 Å of Cu for the layer 306, 20 Å of CoFe for the layer 314, 8 Å of Ru for the layer 318, 13 Å of CoFe for the layer 316 and 40 Å of Ta for the layer 324.

The discussion regarding the examples in the above chart also apply to the embodiment in FIG. 11 except AP1 and AP2 in FIG. 11 are to be considered as AP2 and AP1 in the chart.

Discussion

It has been found that by removing the pinning layer for pinning a magnetic moment of the AP pinned layer that the amplitude read output of the read head can be increased 30% to 40%. Further, by uniformly stabilizing the free layer structure the amplitude is still further increased and the track width of the read head can be made more narrow to increase the linear read bit density of the read head.

It should be understood that the biasing layer structures 240 and 326 may be composed differently than that shown in FIGS. 10 and 11. For instance, the spacer layer 330 may be sufficiently thin and preferably ruthenium (Ru) so that there is an antiparallel coupling between the pinned layer 328 and the free layer structure 302. With this arrangement the pinned layer 328 would be pinned by the AFM pinning layer 332. Further, the biasing layer structure 326 may omit the AFM pinning layer 332 and employ, in lieu thereof, a hard bias pinning layer which is separated from the free layer structure 302 by the spacer layer 330. The hard bias layer may be cobalt platinum chromium (CoPtCr) wherein end fields from the hard bias layer longitudinally stabilize the magnetic moment 312 of the free layer structure. With this arrangement there would be no AFM pinning layer within the read head.

The spin valve sensor described herein is a current in plane (CIP) spin valve sensor since the sense current $I_S$ is conducted parallel to the major thin film planes of the sensor as shown in FIG. 11. The inventive concepts described herein also apply to a current perpendicular to the planes (CPP) spin valve sensor where the sense current $I_s$ is conducted perpendicular to the major thin film planes of the sensor. Further, the inventive concepts are applicable to magnetoresistive sensors other than spin valve sensors such as a tunnel junction sensor where a tunneling current is conducted through the sensor in a direction perpendicular to the major thin film planes of the sensor. Still further, the slider supporting the magnetoresistive sensor may have a head surface other than the aforementioned ABS such as a tape surface for use in a tape drive.

The following commonly assigned U.S. Patents are incorporated in their entirety by reference herein: (1) U.S. Pat. No. 5,465,185; (2) U.S. Pat. No. 5,583,725; (3) U.S. Pat. No. 5,768,069; (4) U.S. Pat. No. 6,040,961; (5) U.S. Pat. No. 6,117,569; (6) U.S. Pat. No. 6,127,053; and (7) U.S. Pat. No. 6,219,211 B1.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic head assembly that has a head surface for facing a magnetic medium comprising:
   a read head that includes a magnetoresistive sensor;
   the magnetoresistive sensor including:
      an antiparallel (AP) pinned layer structure;
      a ferromagnetic free layer having a magnetic moment that is free to rotate in response to a field signal; and
      a nonmagnetic electrically conductive spacer layer located between the free layer and the AP pinned layer structure;
      the antiparallel (AP) pinned layer structure including:
      ferromagnetic first and second antiparallel (AP) pinned layers;
      an antiparallel coupling (APC) layer located between and interfacing the first and second AP pinned layers;
      the first AP pinned layer interfacing the antiparallel coupling layer and the second AP pinned layer interfacing the spacer layer;
      the second AP pinned layer being $Co_{90}Fe_{10}$ and the first AP pinned layer having an iron (Fe) content greater than the iron (Fe) content in the second AP pinned layer up to 40% so that the first and second AP pinned layers self pin one another without assistance of an antiferromagnetic (AFM) pinning layer; and
      an in-stack longitudinal biasing layer structure located within a track width of the sensor and magnetostatically coupled to the free layer for longitudinal biasing the magnetic moment of the free layer parallel to the head surface and parallel to major planes of the layers of the sensor.

2. A magnetic head assembly as claimed in claim 1 wherein the biasing layer structure includes:
   a ferromagnetic pinned layer that has a magnetic moment;
   a nonmagnetic electrically conductive coupling layer located between and interfacing the pinned layer and the free layer so that the pinned layer and the free layer are magnetically coupled; and
   an antiferromagnetic (AFM) pinning layer exchange coupled to the pinned layer for pinning the magnetic moment of the pinned layer parallel to the head surface and parallel to the major planes of the layers of the sensor.

3. A magnetic head assembly as claimed in claim 2 wherein the AFM pinning layer is platinum manganese (PtMn).

4. A magnetic head assembly as claimed in claim 3 wherein the coupling layer of the biasing layer structure is tantalum (Ta).

5. A magnetic head assembly as claimed in claim 1 including:
   nonmagnetic electrically nonconductive first and second read gap layers;
   the magnetoresistive sensor being located between the first and second read gap layers;
   ferromagnetic first and second shield layers; and
   the first and second read gap layers being located between the first and second shield layers.

6. A magnetic head assembly as claimed in claim 5 further comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions.

7. A magnetic head assembly as claimed in claim 6 wherein the free layer is located between the AP pinned layer structure and the first pole piece layer.

8. A magnetic head assembly as claimed in claim 6 wherein the AP pinned layer structure is located between the free layer and the first pole piece layer.

9. A magnetic head assembly as claimed in claim 6 wherein the biasing layer structure includes:
   a ferromagnetic pinned layer that has a magnetic moment;
   a nonmagnetic electrically conductive coupling layer located between and interfacing the pinned layer and the free layer so that the pinned layer and the free layer are magnetically coupled; and
   an antiferromagnetic (AFM) pinning layer exchange coupled to the pinned layer for pinning the magnetic moment of the pinned layer parallel to the head surface and parallel to the major planes of the layers of the sensor.

10. A magnetic head assembly as claimed in claim 9 wherein:
    the AFM pinning layer is platinum manganese (PtMn); and
    the coupling layer of the biasing layer structure is tantalum (Ta).

11. A magnetic head assembly that has a head surface for facing a magnetic medium comprising:
    a read head that includes a magnetoresistive sensor;
    the magnetoresistive sensor including:
       an antiparallel (AP) pinned layer structure;
       a ferromagnetic free layer having a magnetic moment that is free to rotate in response to a field signal; and
       a nonmagnetic electrically conductive spacer layer located between the free layer and the AP pinned layer structure; and an in-stack longitudinal biasing layer structure located within a track width of the sensor and magnetostatically coupled to the free layer for longitudinal biasing the magnetic moment of the free layer parallel to the head surface and parallel to major planes of the layers of the sensor;

the antiparallel (AP) pinned layer structure including:
ferromagnetic first and second antiparallel (AP) pinned layers;
an antiparallel coupling (APC) layer located between and interfacing the first and second AP pinned layers;
the second AP pinned layer being $Co_{90}Fe_{10}$ and the first AP pinned layer having an iron (Fe) content greater than the iron (Fe) content in the second AP pinned layer up to 40% so that the first and second AP pinned layers self pin one another without assistance of an antiferromagnetic (AFM) pinning layer; and the biasing layer structure including:
a ferromagnetic pinned layer that has a magnetic moment;
a nonmagnetic electrically conductive coupling layer located between and interfacing the pinned layer and the free layer so that the pinned layer and the free layer are magnetically coupled; and
an antiferromagnetic (AFM) pinning layer exchange coupled to the pinned layer for pinning the magnetic moment of the pinned layer parallel to the head surface and parallel to the major planes of the layers of the sensor.

12. A magnetic head assembly that has a head surface for facing a magnetic medium comprising:

a read head that includes:
nonmagnetic electrically nonconductive first and second read gap layers;
a magnetoresistive sensor located between the first and second read gap layers;
ferromagnetic first and second shield layers; and
the first and second read gap layers being located between the first and second shield layers;

a write head that includes:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; the magnetoresistive sensor including:
an antiparallel (AP) pinned layer structure;
a ferromagnetic free layer having a magnetic moment that is free to rotate in response to a field signal;
a nonmagnetic electrically conductive spacer layer located between the free layer and the AP pinned layer structure; and
an in-stack longitudinal biasing layer structure located within a track width of the sensor and magnetostatically coupled to the free layer for longitudinal biasing the magnetic moment of the free layer parallel to the head surface and parallel to major planes of the layers of the sensor;

the antiparallel (AP) pinned layer structure including:
ferromagnetic first and second antiparallel (AP) pinned layers;
an antiparallel coupling (APC) layer located between and interfacing the first and second AP pinned layers;
the second AP pinned layer being $Co_{90}Fe_{10}$ and the first AP pinned layer having an iron (Fe) content greater than the iron (Fe) content in the second AP pinned layer up to 40% so that the first and second AP pinned layers self pin one another without assistance of an antiferromagnetic (AFM) pinning layer; and the biasing layer structure including:
a ferromagnetic pinned layer that has a magnetic moment;
a nonmagnetic electrically conductive coupling layer located between and interfacing the pinned layer and the free layer so that the pinned layer and the free layer are magnetically coupled; and
an antiferromagnetic (AFM) pinning layer exchange coupled to the pinned layer for pinning the magnetic moment of the pinned layer parallel to the head surface and parallel to the major planes of the layers of the sensor.

13. A magnetic disk drive including at least one magnetic head assembly that has a head surface for facing a magnetic medium and that includes a write head and a read head, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;

the read head including:
nonmagnetic electrically nonconductive first and second read gap layers;
a magnetoresistive sensor located between the first and second read gap layers;
ferromagnetic first and second shield layers; and
the first and second read gap layers located between the first and second shield layers;

the magnetoresistive sensor including:
an antiparallel (AP) pinned layer structure;
a ferromagnetic free layer having a magnetic moment that is free to rotate in response to a field signal;
a nonmagnetic electrically conductive spacer layer located between the free layer and the AP pinned layer structure; and
an in-stack longitudinal biasing layer structure located within a track width of the sensor and magnetostatically coupled to the free layer for longitudinal biasing the magnetic moment of the free layer parallel to the head surface and parallel to major planes of the layers of the sensor;

the antiparallel (AP) pinned layer structure including:
ferromagnetic first and second antiparallel (AP) pinned layers;
an antiparallel coupling (APC) layer located between and interfacing the first and second ALP pinned layers; and
the first AP pinned layer interfacing the antiparallel coupling layer and the second AP pinned layer interfacing the spacer layer;
the second AP pinned layer being $Co_{90}Fe_{10}$ and the first AP pinned layer having an iron (Fe) content greater than the iron (Fe) content in the second AP pinned layer up to 40% so that the first and second AP pinned layers self pin one another without assistance of an antiferromagnetic (AFM) pinning layer;

a housing;

the magnetic medium being supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

14. A magnetic disk drive as claimed in claim 13 wherein the free layer is located between the AP pinned layer structure and the first pole piece layer.

15. A magnetic disk drive as claimed in claim 13 wherein the AP pinned layer structure is located between the free layer and the first pole piece layer.

16. A magnetic disk drive as claimed in claim 13 wherein the biasing layer structure includes:

a ferromagnetic pinned layer that has a magnetic moment;

a nonmagnetic electrically conductive coupling layer located between and interfacing the pinned layer and the free layer so that the pinned layer and the free layer are magnetically coupled; and an antiferromagnetic (AFM) pinning layer exchange coupled to the pinned layer for pinning the magnetic moment of the pinned layer parallel to the head surface and parallel to the major planes of the layers of the sensor.

17. A magnetic disk drive as claimed in claim 16 wherein:

the AFM pinning layer is platinum manganese (PtMn); and the coupling layer of the biasing layer structure is tantalum (Ta).

18. A magnetic disk drive including at least one magnetic head assembly that has a head surface for facing a magnetic medium and that includes a write head and a read head, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;

the read head including:
nonmagnetic electrically nonconductive first and second read gap layers;
a magnetoresistive sensor located between the first and second read gap layers;
ferromagnetic first and second shield layers; and
the first and second read gap layers located between the first and second shield layers;

the magnetoresistive sensor including:
an antiparallel (AP) pinned layer structure;
a ferromagnetic free layer having a magnetic moment that is free to rotate in response to a field signal;
a nonmagnetic electrically conductive spacer layer located between the free layer and the AP pinned layer structure; and
an in-stack longitudinal biasing layer structure located within a track width of the sensor and magnetostatically coupled to the free layer for longitudinal biasing the magnetic moment of the free layer parallel to the head surface and parallel to major planes of the layers of the sensor;

the antiparallel (AP) pinned layer structure including:
ferromagnetic first and second antiparallel (AP) pinned layers;
an antiparallel coupling (APC) layer located between and interfacing the first and second AP pinned layers;
the second AP pinned layer being $Co_{90}Fe_{10}$ and the first AP pinned layer having an iron (Fe) content greater than the iron (Fe) content in the second AP pinned layer up to 40% so that the first and second AP pinned layers self pin one another without assistance of an antiferromagnetic (AFM) pinning layer; and the biasing layer structure including:
a ferromagnetic pinned layer that has a magnetic moment;
a nonmagnetic electrically conductive coupling layer located between and interfacing the pinned layer and the free layer so that the pinned layer and the free layer are magnetically coupled; and
an antiferromagnetic (AFM) pinning layer exchange coupled to the pinned layer for pinning the magnetic moment of the pinned layer parallel to the head surface and parallel to the major planes of the layers of the sensor;

a housing;

the magnetic medium being supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

19. A method of making a magnetic head assembly which has a head surface for facing a magnetic medium comprising the steps of:

forming a read head that includes a magnetoresistive sensor;

a making of the magnetoresistive sensor including the steps of:
forming an antiparallel (AP) pinned layer structure;
forming a ferromagnetic free layer that has a magnetic moment that is free to rotate in response to a field signal; and
forming a nonmagnetic electrically conductive spacer layer between the free layer and the AP pinned layer structure;

the forming of the antiparallel (AP) pinned layer structure including the steps of
forming ferromagnetic first and second antiparallel (AP) pinned layers;
forming an antiparallel coupling (APC) layer between and interfacing the first and second AP pinned layers;
forming the first AP pinned layer interfacing the antiparallel coupling layer and the second AP pinned layer interfacing the spacer layer;

forming the second AP pinned layer of $Co_{90}Fe_{10}$ and forming the first AP pinned layer with an iron (Fe) content greater than the iron (Fe) content in the second AP pinned layer up to 40% so that the first and second AP pinned layers self pin one another without assistance of an antiferromagnetic (AFM) pinning layer; and forming an in-stack longitudinal biasing layer structure within a track width of the sensor and magnetostatically coupled to the free layer for longitudinal biasing the magnetic moment of the free layer parallel to the head surface and parallel to major planes of the layers of the sensor.

20. A method as claimed in claim 19 wherein a making of the biasing layer structure includes the steps of:

forming a ferromagnetic pinned layer that has a magnetic moment;

forming a nonmagnetic electrically conductive coupling layer between and interfacing the pinned layer and the free layer so that the pinned layer and the free layer are magnetostatically coupled; and forming an antiferromagnetic (AFM) pinning layer exchange coupled to the pinned layer for pinning the magnetic moment of the pinned layer parallel to the head surface and parallel to the major planes of the layers of the sensor.

21. A method as claimed in claim 20 wherein the AFM pinning layer is formed of platinum manganese (PtMn).

22. A method as claimed in claim 21 wherein the coupling layer of the biasing layer structure is formed of tantalum (Ta).

23. A method of making a magnetic head assembly as claimed in claim 19 including the steps of:

forming nonmagnetic electrically nonconductive first and second read gap layers with the magnetoresistive sensor located therebetween; and forming ferromagnetic first and second shield layers with the first and second read gap layers located therebetween.

24. A method of a making magnetic head assembly as claimed in claim 23 further comprising the steps of:

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region.

25. A method as claimed in claim 24 wherein the free layer is formed between the AP pinned layer structure and the first pole piece layer.

26. A method as claimed in claim 24 wherein the AP pinned layer structure is formed between the free layer and the first pole piece layer.

27. A method as claimed in claim 24 wherein a making of the biasing layer structure includes the steps of:

forming a ferromagnetic pinned layer that has a magnetic moment;

forming a nonmagnetic electrically conductive coupling layer between and interfacing the pinned layer and the free layer so that the pinned layer and the free layer are magnetostatically coupled; and forming an antiferromagnetic (AFM) pinning layer exchange coupled to the pinned layer for pinning the magnetic moment of the pinned layer parallel to the head surface and parallel to the major planes of the layers of the sensor.

28. A method as claimed in claim 27 wherein:

the AFM pinning layer is formed of platinum manganese (PtMn); and the coupling layer of the biasing layer structure is formed of tantalum (Ta).

29. A method of making a magnetic head assembly which has a head surface for facing a magnetic medium comprising the steps of:

forming a read head that includes a magnetoresistive sensor;

a making of the magnetoresistive sensor including the steps of:

forming an antiparallel (AP) pinned layer structure;

forming a ferromagnetic free layer that has a magnetic moment that is free to rotate in response to a field signal;

forming a nonmagnetic electrically conductive spacer layer between the free layer and the AP pinned layer structure; and forming an in-stack longitudinal biasing layer structure within a track width of the sensor and magnetostatically coupled to the free layer for longitudinal biasing the magnetic moment of the free layer parallel to the head surface and parallel to major planes of the layers of the sensor;

the forming of the antiparallel (AP) pinned layer structure including the steps of:

forming ferromagnetic first and second antiparallel (AP) pinned layers;

forming an antiparallel coupling (APC) layer between and interfacing the first and second AP pinned layers;

forming the second AP pinned layer of $Co_{90}Fe_{10}$ and forming the first AP pinned layer with an iron (Fe) content greater than the iron (Fe) content in the second AP pinned layer up to 40% so that the first and second AP pinned layers self pin one another without assistance of an antiferromagnetic (AFM) pinning layer; and a making of the biasing layer structure including the steps of:

forming a ferromagnetic pinned layer that has a magnetic moment;

forming a nonmagnetic electrically conductive coupling layer between and interfacing the pinned layer and the free layer so that the pinned layer and the free layer are magnetostatically coupled; and forming an antiferromagnetic (AFM) pinning layer exchange coupled to the pinned layer for pinning the magnetic moment of the pinned layer parallel to the head surface and parallel to the major planes of the layers of the sensor.

30. A method of making a magnetic head assembly which has a head surface for facing a magnetic medium comprising the steps of:

forming a read head including the steps of:

forming nonmagnetic electrically nonconductive first and second read gap layers with a magnetoresistive sensor located therebetween; and forming ferromagnetic first and second shield layers with the first and second read gap layers located therebetween;

making a write head including the steps of:
    forming ferromagnetic first and second pole piece layers in pole tip, yoke and back gap regions wherein the yoke region is located between the pole tip and back gap regions;
    forming a nonmagnetic electrically nonconductive write gap layer between the first and second pole piece layers in the pole tip region;
    forming an insulation stack with at least one coil layer embedded therein between the first and second pole piece layers in the yoke region; and
    connecting the first and pole piece layers at said back gap region;
a making of the magnetoresistive sensor including the steps of:
    forming an antiparallel (AP) pinned layer structure;
    forming a ferromagnetic free layer that has a magnetic moment that is free to rotate in response to a field signal;
    forming a nonmagnetic electrically conductive spacer layer between the free layer and the AP pinned layer structure; and
    forming an in-stack longitudinal biasing layer structure within a track width of the sensor and magnetostatically coupled to the free layer for longitudinal biasing the magnetic moment of the free layer parallel to the head surface and parallel to major planes of the layers of the sensor;
the forming of the antiparallel (AP) pinned layer structure including the steps of:
    forming ferromagnetic first and second antiparallel (AP) pinned layers;
    forming an antiparallel coupling (APC) layer between and interfacing the first and second AP pinned layers;
    forming the second AP pinned layer of $Co_{90}Fe_{10}$ and forming the first AP pinned layer with an iron (Fe) content greater than the iron (Fe) content in the second AP pinned layer up to 40% so that the first and second AP pinned layers self pin one another without assistance of an antiferromagnetic (AFM) pinning layer; and
a making of the biasing layer structure including the steps of:
    forming a ferromagnetic pinned layer that has a magnetic moment;
    forming a nonmagnetic electrically conductive coupling layer between and interfacing the pinned layer and the free layer so that the pinned layer and the free layer are magnetostatically coupled; and
    forming an antiferromagnetic (AFM) pinning layer exchange coupled to the pinned layer for pinning the magnetic moment of the pinned layer parallel to the head surface and parallel to the major planes of the layers of the sensor.

31. A magnetic head assembly that has a head surface for facing a magnetic medium comprising:
    a read head that includes a magnetoresistive sensor;
    the magnetoresistive sensor including:
        an antiparallel (AP) pinned layer structure;
        a ferromagnetic free layer having a magnetic moment that is free to rotate in response to a field signal; and
        a nonmagnetic electrically conductive spacer layer located between the free layer and the AP pinned layer structure;
    the antiparallel (AP) pinned layer structure including:
        ferromagnetic first and second antiparallel (AP) pinned layers;
        an antiparallel coupling (APC) layer located between and interfacing the first and second AP pinned layers;
        the first AP pinned layer interfacing the antiparallel coupling layer and the second AP pinned layer interfacing the spacer layer;
        the first AP pinned layer being $Co_{60}Fe_{40}$ and the second AP pinned layer being $Co_{90}Fe_{10}$ so that the first and second AP pinned layers self pin one another without assistance of an antiferromagnetic (AFM) pinning layer; and
    an in-stack longitudinal biasing layer structure located within a track width of the sensor and magnetostatically coupled to the free layer for longitudinal biasing the magnetic moment of the free layer parallel to the head surface and parallel to major planes of the layers of the sensor.

32. A magnetic disk drive including at least one magnetic head assembly that has a head surface for facing a magnetic medium and that includes a write head and a read head, comprising:
    the write head including:
        ferromagnetic first and second pole piece layers that have a yoke portion located between a pole tip portion and a back gap portion;
        a nonmagnetic write gap layer located between the pole tip portions of the first and second pole piece layers;
        an insulation stack with at least one coil layer embedded therein located between the yoke portions of the first and second pole piece layers; and
        the first and second pole piece layers being connected at their back gap portions;
    the read head including:
        nonmagnetic electrically nonconductive first and second read gap layers;
        a magnetoresistive sensor located between the first and second read gap layers;
        ferromagnetic first and second shield layers; and
        the first and second read gap layers located between the first and second shield layers;
    the magnetoresistive sensor including:
        an antiparallel (AP) pinned layer structure;
        a ferromagnetic free layer having a magnetic moment that is free to rotate in response to a field signal;
        a nonmagnetic electrically conductive spacer layer located between the free layer and the AP pinned layer structure; and
        an in-stack longitudinal biasing layer structure located within a track width of the sensor and magnetostatically coupled to the free layer for longitudinal biasing the magnetic moment of the free layer parallel to the head surface and parallel to major planes of the layers of the sensor;
    the antiparallel (AP) pinned layer structure including:
        ferromagnetic first and second antiparallel (AP) pinned layers;
        an antiparallel coupling (APC) layer located between and interfacing the first and second AP pinned layers; and
        the first AP pinned layer interfacing the antiparallel coupling layer and the second AP pinned layer interfacing the spacer layer;
        the first AP pinned layer being $Co_{60}Fe_{40}$ and the second AP pinned layer being $Co_{90}Fe_{10}$ so that the first and second AP pinned layers self pin one another without assistance of an antiferromagnetic (AFM) pinning layer; and a housing;

the magnetic medium being supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

33. A method of making a magnetic head assembly which has a head surface for facing a magnetic medium comprising the steps of:

forming a read head that includes a magnetoresistive sensor;

a making of the magnetoresistive sensor including the steps of:

forming an antiparallel (AP) pinned layer structure;

forming a ferromagnetic free layer that has a magnetic moment that is free to rotate in response to a field signal; and forming a nonmagnetic electrically conductive spacer layer between the free layer and the AP pinned layer structure;

the forming of the antiparallel (AP) pinned layer structure including the steps of:

forming ferromagnetic first and second antiparallel (AP) pinned layers;

forming an antiparallel coupling (APC) layer between and interfacing the first and second AP pinned layers;

forming the first AP pinned layer interfacing the antiparallel coupling layer and the second AP pinned layer interfacing the spacer layer;

the first AP pinned layer being formed of $Co_{60}Fe_{40}$ and the second AP pinned layer being formed of $Co_{90}Fe_{10}$ so that the first and second AP pinned layers self pin one another without assistance of an antiferromagnetic (AFM) pinning layer; and forming an in-stack longitudinal biasing layer structure within a track width of the sensor and magnetostatically coupled to the free layer for longitudinal biasing the magnetic moment of the free layer parallel to the head surface and parallel to major planes of the layers of the sensor.

* * * * *